United States Patent
Aoki

(10) Patent No.: US 7,593,187 B2
(45) Date of Patent: Sep. 22, 2009

(54) MAGNETIC HEAD HAVING A HEATING COIL

(75) Inventor: Kenichiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 358 days.

(21) Appl. No.: 11/593,684

(22) Filed: Nov. 7, 2006

(65) Prior Publication Data
US 2008/0019041 A1 Jan. 24, 2008

(30) Foreign Application Priority Data
Jul. 20, 2006 (JP) ............................. 2006-197938

(51) Int. Cl.
*G11B 5/33* (2006.01)
(52) U.S. Cl. ............................... 360/125.74
(58) Field of Classification Search ............ 360/125.74, 360/125.31, 125.71, 125.75
See application file for complete search history.

(56) References Cited

U.S. PATENT DOCUMENTS

| | | | | |
|---|---|---|---|---|
| 7,023,660 | B2 * | 4/2006 | Hsiao et al. ................. | 360/128 |
| 7,224,553 | B2 * | 5/2007 | Sasaki et al. ................ | 360/128 |
| 7,428,124 | B1 * | 9/2008 | Song et al. .................. | 360/128 |
| 2004/0075940 | A1 | 4/2004 | Bajorek et al. .............. | 360/110 |
| 2004/0130820 | A1 | 7/2004 | Ota ............................. | 360/128 |
| 2004/0179299 | A1 | 9/2004 | Sasaki et al. ................ | 360/128 |
| 2004/0201920 | A1 * | 10/2004 | Koide et al. ................. | 360/128 |
| 2005/0270694 | A1 | 12/2005 | Umehara et al. ............ | 360/126 |
| 2006/0007594 | A1 * | 1/2006 | Umehara et al. ............ | 360/126 |
| 2006/0034014 | A1 | 2/2006 | Kato et al. .................. | 360/128 |
| 2006/0285248 | A1 * | 12/2006 | Pust et al. .................... | 360/128 |

FOREIGN PATENT DOCUMENTS

| | | |
|---|---|---|
| JP | 05-020635 | 1/1993 |
| JP | 2004-199797 | 7/2004 |
| JP | 2004-241105 | 8/2004 |
| JP | 2006-134470 | 5/2006 |

* cited by examiner

*Primary Examiner*—Jefferson Evans
(74) *Attorney, Agent, or Firm*—Greer, Burns & Crain, Ltd.

(57) ABSTRACT

A magnetic head is composed of a write head which magnetically records information by emitting magnetic flux, which is generated by a write coil, from a magnetic pole unit to a recording medium; and a read head having a reading element which converts record magnetic flux, which is emitted from the recording medium, to an electric signal. In a write coil facing area facing an area in which the thin-film coil pattern of the write coil is disposed, a heater coil which causes a medium facing surface to protrude toward a recording medium side by thermal expansion caused by power distribution and overheating is disposed via an insulating layer. In the heater coil, a wide terminal pattern is disposed outside the write coil facing area, and a heater pattern having a width narrower than the terminal pattern is disposed in the write coil facing area.

7 Claims, 19 Drawing Sheets

MAGNETIC HEAD HAVING A HEATING COIL

This application claims priority to prior application No.JP 2006-197938, filed Jul. 20, 2006, in Japan.

BACKGROUND OF THE INVENTION

1. Field of the Invention

The present invention relates to a magnetic head which is caused to fly over a rotating recording medium and read/write data, and particularly relates to a magnetic head which can control the clearance between a head and a recording medium by changing the protruding distance of a medium facing surface by thermal expansion caused by power distribution to and heating of a heater.

2. Description of the Related Arts

Conventionally, the flying height of a magnetic head with respect to a recording surface of a magnetic disk has to be reduced in order to realize a high recording density of a magnetic disk apparatus; and, recently, flying heights of 10 nm order have been realized. However, there are problems that collision with minute protrusions on the magnetic disk surface readily occur when the flying height of the magnetic head is reduced, and variations in the clearance of heads are present in the range of common differences of mechanisms; therefore, when contact with the medium is taken into consideration, flying heights smaller than the common differences cannot be set. As methods which solve the problems, methods of JP05-020635, JP2005-071546 and JP2005-276284 in which a heater is built in a head and the clearance between the head and a recording surface of a magnetic disk is controlled by utilizing a protruding phenomenon of a head flying surface caused by thermal expansion accompanying power distribution to the heater have been proposed. In JP05-020635, a thin film resistive element which functions as a heater is formed in an insulating layer of a thin film magnetic head, and power is distributed to the thin film resistive element in accordance with needs so as to heat the element, thereby causing a magnetic pole distal end portion to thermally expand and protrude. In JP2005-071546,with respect to increase in an apparatus temperature and an element temperature due to recording/reproduction, the power applied to an electric conductive film provided in a head is changed so as to maintain a constant element temperature, thereby maintaining a constant clearance between the element and a recording medium. In JP2005-276284, a heating device for increasing flying height which causes a part of an air bearing surface of a head to expand and protrude by heating so as to increase the distance between a recording/reproducing element and a magnetic disk surface and a heating device for reducing flying height which causes another part of the head air bearing surface to expand and protrude by heating so as to reduce the distance between the recording/reproducing element and the magnetic disk surface are provided in the head, and the flying height is corrected such that reproduction can be performed without causing collision, for example, upon activation of the apparatus.

In such a conventional magnetic head in which a heater is built in, the heater efficiency has to be enhanced so that a long protruding distance of a head can be provided with a little heating value of the heater. However, in conventional heater-built-in magnetic heads, what kind of disposition of a heater coil enhances the heater efficiency has not been satisfactorily mentioned, and there have been problems that the heater efficiency is low in some magnetic heads, and sufficient protruding distances cannot be obtained unless the amount of heater power distribution is increased. Also, there has been a problem that, when the temperature is increased too much by the power distribution to the heater coil in order to increase the protruding distance of the head, influence of migration of the heater coil or the heat to a read element or a write element is increased, and durability and performance of the magnetic head is deteriorated.

SUMMARY OF THE INVENTION

According to the present invention to provide a magnetic head which has high heater efficiency for causing a medium facing surface to protrude by thermal expansion and can suppress adverse effects caused by heating to a minimum level.

The present invention is a magnetic head comprising a write head which magnetically records information by emitting magnetic flux, which is generated by a write coil composed of a spiral thin-film coil pattern, from a magnetic pole unit to a recording medium; and a read head having a reading element which is disposed in the vicinity of the write head and converts record magnetic flux, which is emitted from the recording medium, to an electric signal; wherein the magnetic head is characterized in that, in a write coil facing area facing area in which the thin-film coil pattern of the write coil is disposed, a heater coil which causes a medium facing surface to protrude toward a recording medium side by thermal expansion caused by power distribution and overheating is disposed via an insulating layer; and in the heater coil, a wide terminal pattern is disposed outside the write coil facing area, and a heater pattern having a width narrower than the terminal pattern is disposed in the write coil facing area.

Herein, the write coil facing area is generally in contact with a first heater coil outer edge unit in the medium facing surface side of the heater coil and a second heater coil outer edge unit in the opposite side to the medium facing surface, and is an elliptical area or a circular area which is generally in contact with both-side second and fourth heater coil outer edges at positions orthogonal to the first and second heater coil outer edge units.

The heater coil is disposed in an inner magnetic pole side or an outer magnetic pole side of the magnetic pole unit via an insulating layer.

The heater coil is a connected pattern which is disposed in an area except for the area facing the outer magnetic pole in the write coil facing area.

The connected pattern of the heater coil is a generally W-shape connected pattern, furthermore, a first end of the W-shape pattern is positioned at an area boundary and connected to a terminal pattern outside the area, and the other end of the W-shape pattern is returned to the first end side of the W-shape pattern, then extended to the area boundary, and connected to another terminal pattern.

The connected pattern of the heater coil is a generally W-shape connected pattern, and each of the first end and the other end of the W-shape pattern is extended to the area boundary and connected to a terminal pattern.

The heater coil has the heater pattern which is disposed to occupy a 20% or more area of the write coil facing area.

The heater coil has the heater pattern which is disposed so that a resistance value which is 70 percent or more the entire resistance of the heater coil comprising the terminal pattern and the heater pattern is present in the write coil facing area.

The heater coil is formed of a high-resistance heating material containing tungsten and titanium tungsten.

According to the present invention, in the write coil facing area facing the area in which the thin-film coil pattern of the write coil is disposed, the heater coil which causes the medium facing surface is to protrude toward the recording medium side by thermal expansion by power distribution and overheating is disposed via the insulating layer. Thus, the heater pattern which generates heat the most in the heater is disposed in the vicinity of the write coil so as to face the write coil, the heat caused by the power distribution to the heater is efficiently transmitted to the write coil so as to thermally expand the write coil, and the thermal expansion of the write coil causes the medium facing surface of the head to efficiently protrude toward the medium side, thereby controlling the clearance of the write element (magnetic flux emitting unit by write gap) or the read element. Moreover, since the heat of the heater coil is transmitted and dissipated through the write coil, local temperature increase caused by heater overheating can be avoided, migration of the heater coil or influence of the heat on the write element or the read element can be suppressed, and deterioration in the durability and performance of the magnetic head can be prevented. Moreover, in the heater coil, the wide terminal pattern is disposed outside the write coil facing area, and the heater pattern having a width narrower than the terminal pattern is disposed in the write coil facing area; therefore, the part where a heat generation effect is desired to be obtained as a heater is narrowed to increase the resistance, and the terminal pattern which is irrelevant to heat generation is made thick to reduce the resistance and suppress heat generation, thereby achieving efficient heat generation. The above and other objects, features, and advantages of the present invention will become more apparent from the following detailed description with reference to the drawings.

DETAILED DESCRIPTION OF THE PREFERRED EMBODIMENTS

Figure 1:
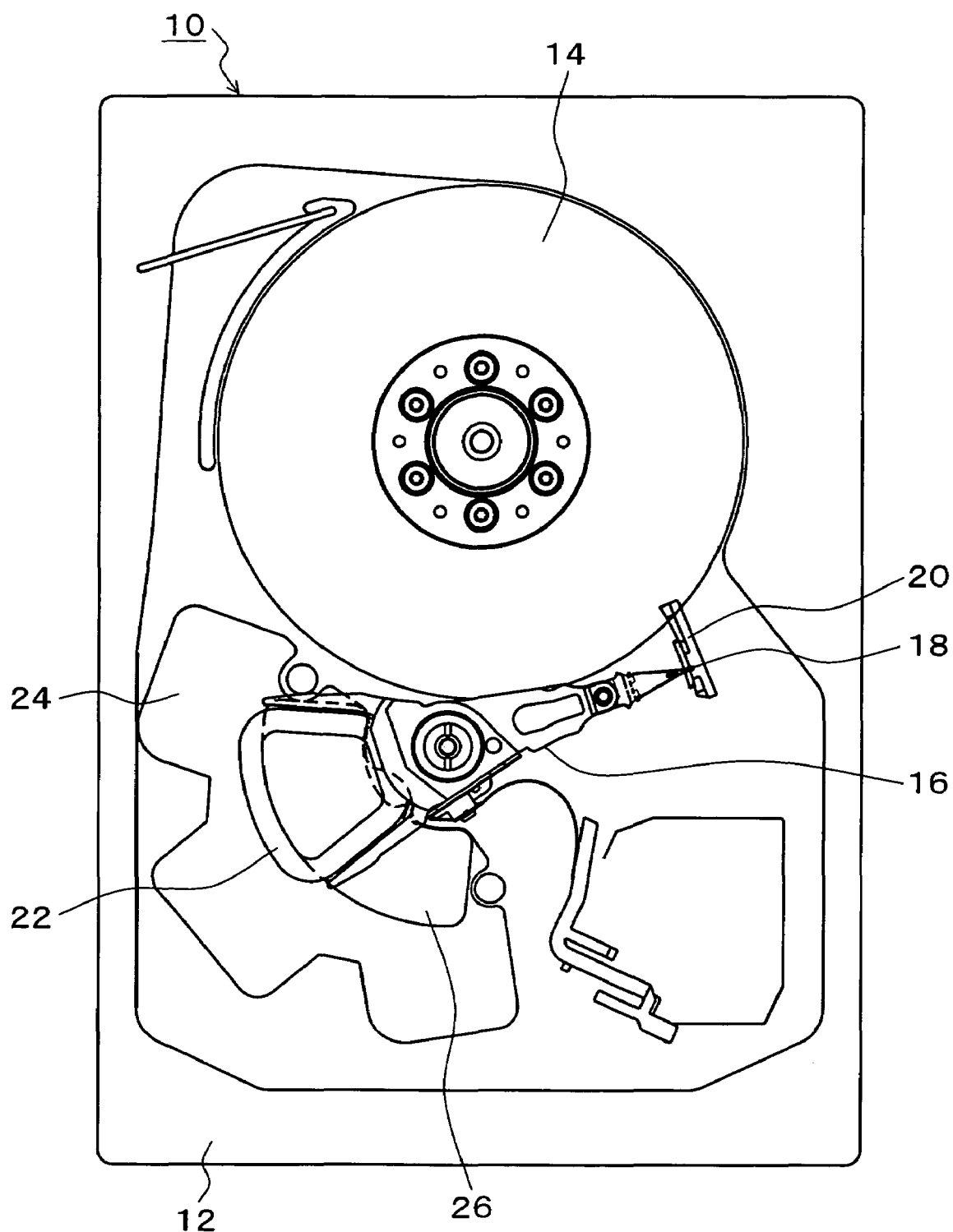
FIG. 1 is an explanatory drawing of a magnetic disk apparatus in which a magnetic head of the present invention is used.

FIG. 1 is an explanatory drawing of a magnetic disk apparatus in which a magnetic head of the present invention is used. In FIG. 1, a magnetic disk 10 shows a structure in a chassis base 12 with a chassis cover removed, a magnetic disk 14 which is rotated at a constant speed by a spindle motor is provided in the chassis base 12, and a rotary actuator 16 is turnably disposed for the magnetic disk 14 by a shaft unit. The rotary actuator 16 supports a magnetic head 18 according to the present invention at the distal end thereof, and a coil 22 is disposed at the rear thereof. The coil 22 is turnable along a magnet 26 on a lower yoke 24 which is fixed to the chassis base 12, and an unillustrated upper yoke having the same shape as the lower yoke 24 is disposed in the upper side of the coil 22; however, in the present embodiment, they are shown in the state that the upper yoke is removed. A magnetic circuit unit is formed by the lower yoke 24, the magnet 26, and the upper yoke (not shown), and the coil 22 is disposed in the magnetic circuit unit, thereby constituting a voice coil motor which drives the rotary actuator 16. In the illustrated state, the rotary actuator 16 has removed the magnetic head 18 from the magnetic disk 14 to a ramp load mechanism 20 and latched it.

Figure 2:
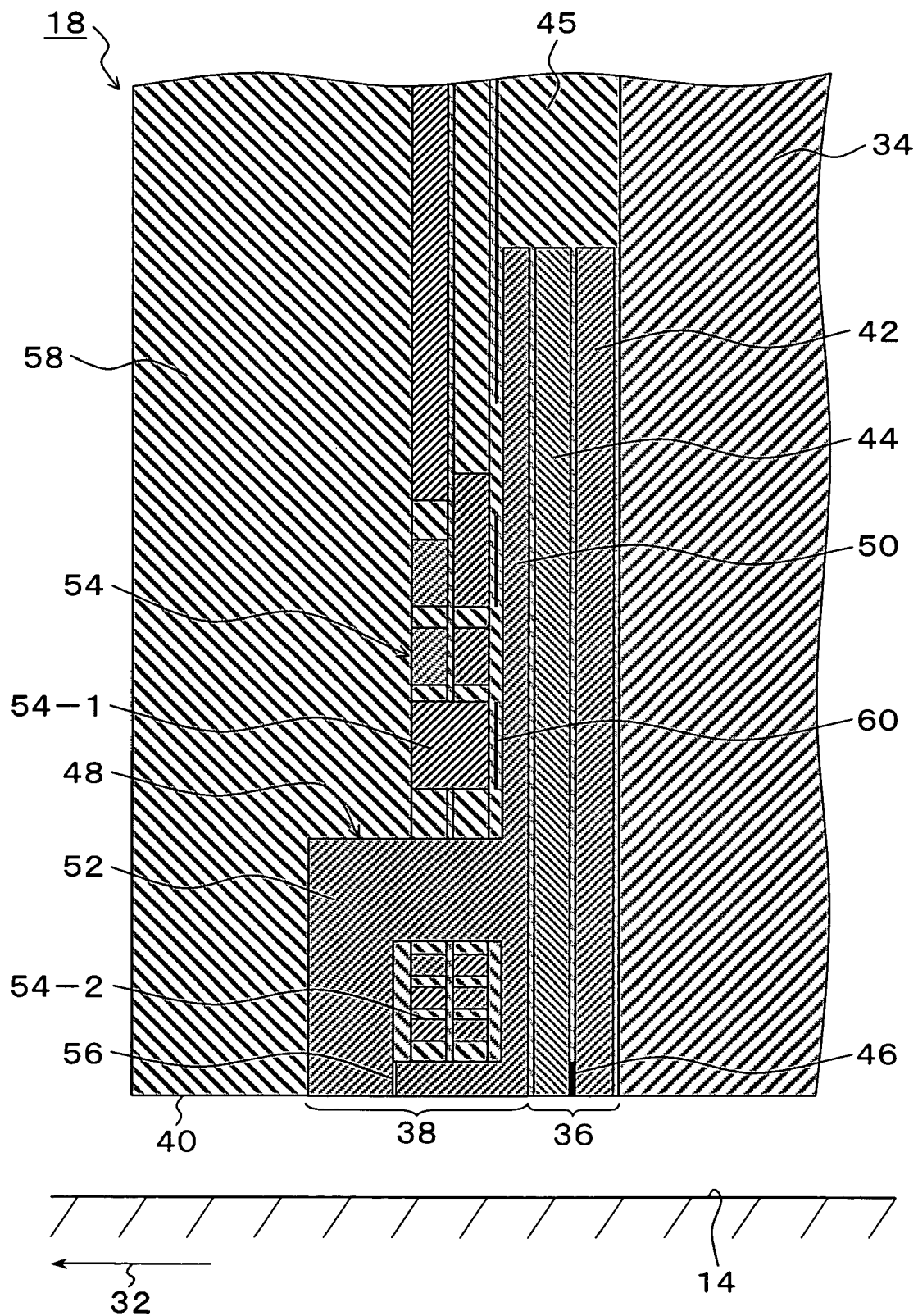
FIG. 2 is a cross sectional view showing an embodiment of the magnetic head according to the present invention.

FIG. 2 is a cross sectional view showing an embodiment of the magnetic head according to the present invention. In FIG. 2, the magnetic head 18 of the present embodiment is provided in the distal end side of a slider. In the magnetic head 18, a read head 36 and a write head 38 are disposed in the distal end side of a substrate 34. The magnetic head 18 has a medium facing surface 40 which faces a medium surface of the magnetic disk 14, and the medium facing surface 40 constitutes a part of an air bearing which flies when receiving airflow caused by movement of the magnetic disk 14 in a disk movement direction 32 shown by an arrow. The read head 36, which is provided subsequent to the substrate 34, forms shield layers 42 and 44 in an insulating layer 45 using aluminum oxide Al2O3, which is known as alumina, and a read element 46 is disposed at a position serving as a read gap of the medium facing surface 40 between the shield layers 42 and 44. A GMR element (Giant Magneto Resistive) or a TMR element (tunneling Magneto Resistance element) is used as the read element 46. Subsequent to the read head 36, a write head 38 is provided. The write head 38 has a magnetic pole unit 48, and the magnetic pole unit 48 has an inner magnetic pole 50 in the side of the read head 36 side and an outer magnetic pole 52 in the distal end side. As the magnetic pole unit 48, Permalloy or an iron cobalt alloy-based magnetic material is used. The outer magnetic pole 52 is positioned in the side of the medium facing surface 40 and protrudes toward the front, and a write gap 56 is formed between it and the inner magnetic pole 50 at the part of the medium facing surface 40. A coil through unit is formed below a connecting unit of the inner magnetic pole 50 and the outer magnetic pole 52, and a write coil 54 is spirally disposed around the connecting unit of the inner magnetic pole 50 and the outer magnetic pole 52. The write coil 54 of the present embodiment has a double wound structure. The write coil 54 generates magnetic flux for recording when a write current is caused to flow therethrough. The magnetic flux is emitted from the write gap 56 of the magnetic pole unit 48 to the side of the magnetic disk 14 and magnetically records information on the magnetic disk 14. For such magnetic head, in the present embodiment, a heater coil 60 is disposed in the side of the inner magnetic pole 50 when viewed from the write coil 54 in the write head 38. The heater coil 60 is formed of a high-resistance heating material such as tungsten (W) or titanium tungsten (TiW); and, when power is distributed to the heater coil 60, heat is transmitted to the facing write coil 54 via the insulating layer 45, the write coil 54 is efficiently thermally expanded, and the part of the medium facing surface 40 including the read element 46 and the write gap 56 is caused to protrude toward the side of the magnetic disk 14.

Figure 3:
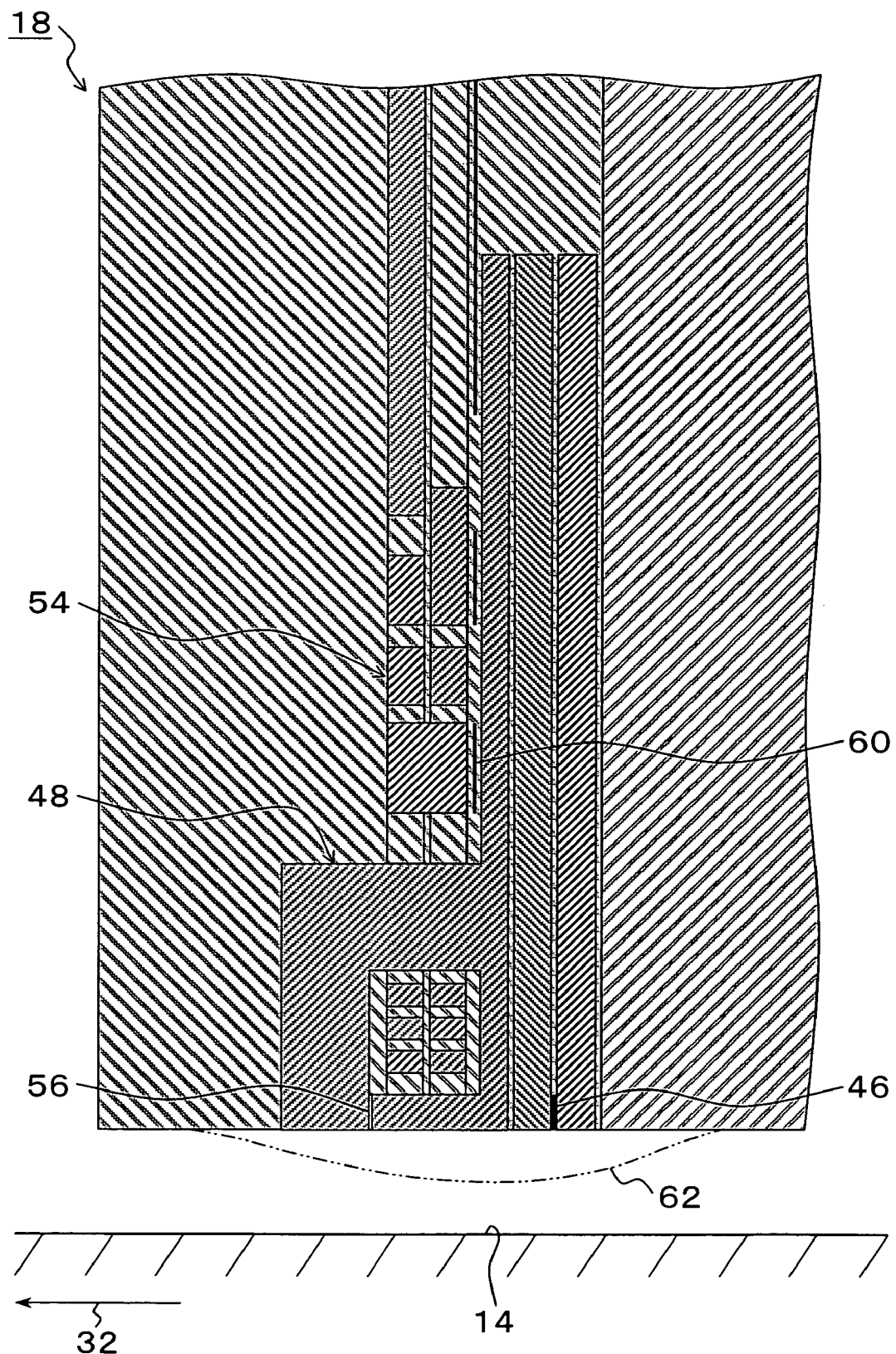
FIG. 3 is an explanatory drawing of a protruding state caused by thermal expansion when electricity flows through heater coil.

FIG. 3 shows protrusion caused by thermal expansion of the medium facing surface 40 when power is distributed to the heater coil 60 provided in the magnetic head and the coil is overheated. Heat is transmitted to the write coil 54 by the heating caused by power distribution to the heater coil 60, and the write coil is caused to thermally expand. Consequently, the medium facing surface 40 facing the magnetic disk 14 is caused to protrude as shown in a protruding unit 62, and the read element 46 and the write gap 56 are brought close to the magnetic disk 14, thereby enabling optimal clearance control.

Figure 4:
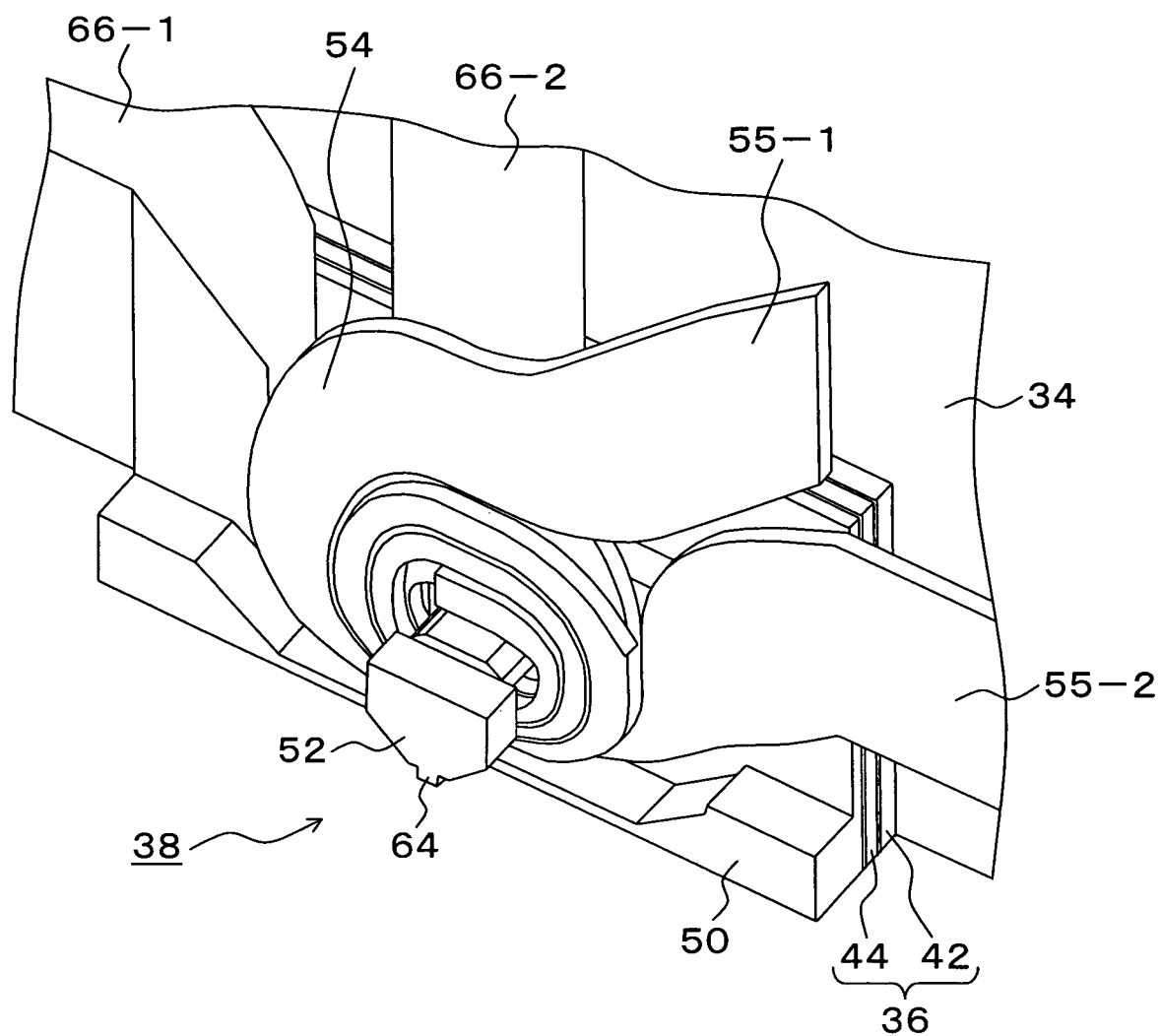
FIG. 4 is a perspective view showing the present embodiment without insulating layer.

FIG. 4 is a perspective view showing an internal structure of the magnetic head 18 of the present embodiment, wherein the insulating layer is removed. In FIG. 4, the inner magnetic pole 50 constituting the magnetic pole unit of the write head 38 is disposed via the read head 36 in the front of the substrate 34, which is composed of the two shield layers 42 and 44, and the outer magnetic pole 52 is disposed at the part which is protruding from the inner magnetic pole 50. The outer magnetic pole 52 forms a distal end unit 64 in the side of the surface facing the magnetic disk, and the width of the distal end unit 64 determines the recording width of the magnetic disk. Between the outer magnetic pole 52 and the inner magnetic pole 50, the write coil 54, which is spirally double-wound, is disposed. More specifically, the write coil 54 is led in from a terminal pattern 55-1, spirally wound in the side of the outer magnetic pole 52, then bent at the center to the side of the substrate 34, spirally wound in the same direction, and then led out from a terminal pattern 55-2.

Figure 5:
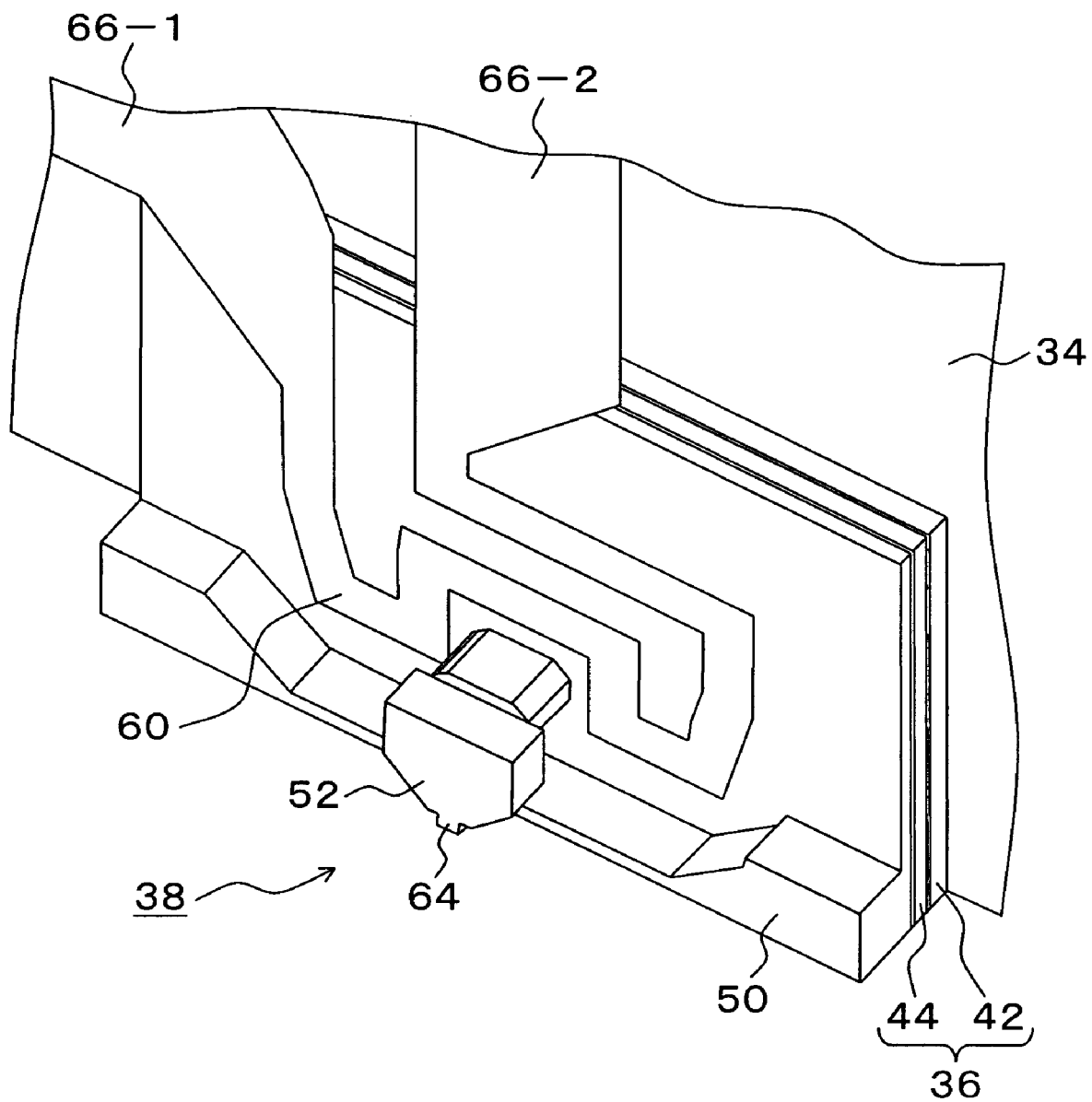
FIG. 5 is a perspective view showing disposition of heater coil with the write coil of FIG. 4 removed.

FIG. 5 is an explanatory drawing showing the internal structure without the write coil 54 of FIG. 4. When the write coil 54 is removed, the heater coil 60 is disposed behind it. The heater coil 60 forms a coil pattern having a predetermined width at a position facing the write coil 54 shown in FIG. 4, and terminal patterns 66-1 and 66-2 having wide widths are connected to the coil pattern.

Figure 6:
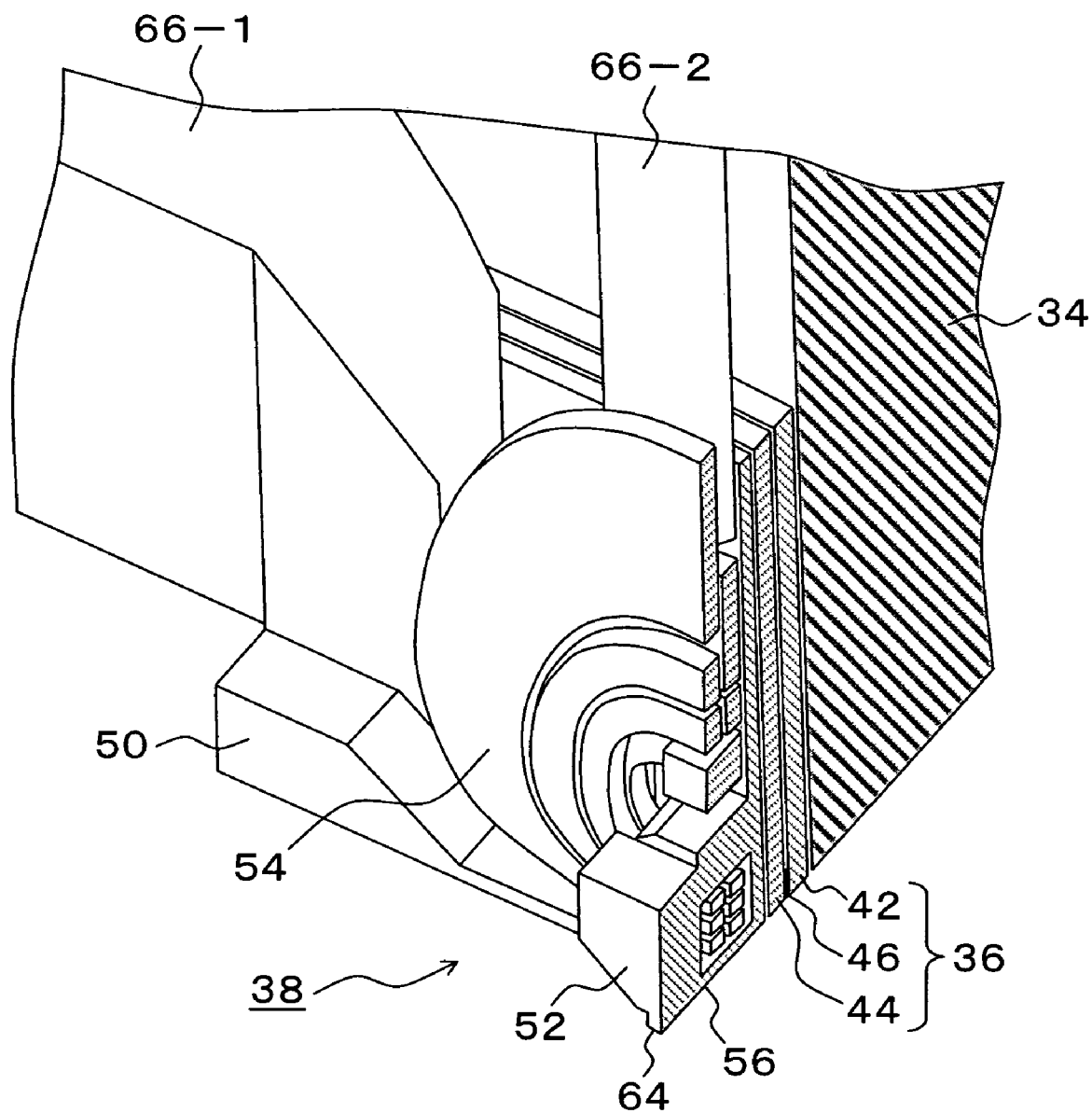
FIG. 6 is a cross sectional view showing FIG. 3 cut at the position of the write gap.

FIG. 6 is a cross sectional view showing FIG. 3 cut at the position of the write gap in a depth direction. As is clear from the cross sectional view of FIG. 6, it can be understood that the write coil 54 is spirally double-wound and disposed around the connecting unit connecting the outer magnetic pole 52 with the inner magnetic pole 50. The write gap 56 is formed inside of the distal end unit 64 of the outer magnetic pole 52. Furthermore, the read element 46 is disposed between the shield layers 42 and 44 in the side of the substrate 34, thereby constituting the read head 36.

Figure 7:
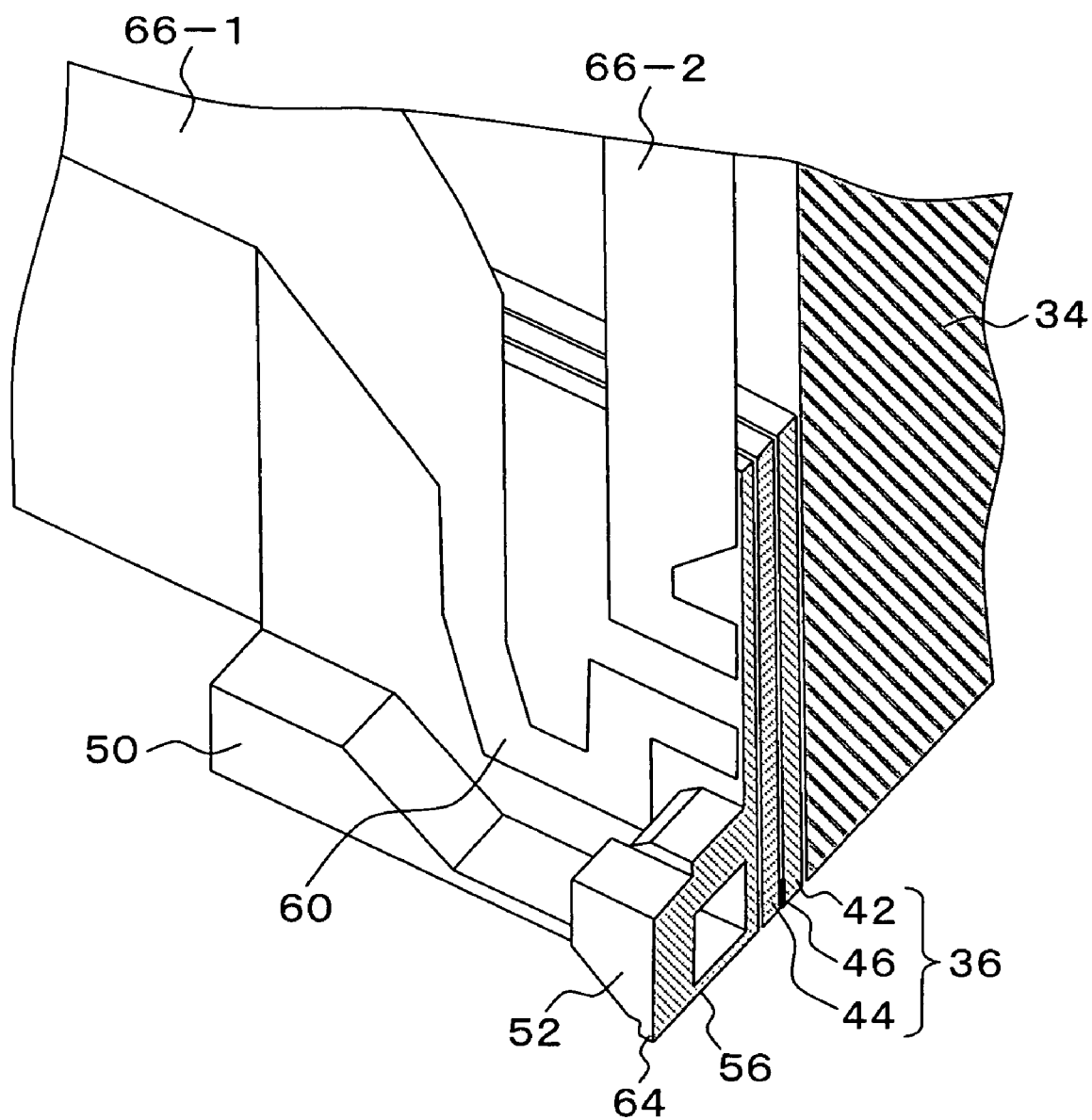
FIG. 7 is a cross sectional view showing disposition of the heater coil with the write coil of FIG. 4 removed in FIG. 6.

FIG. 7 is an explanatory drawing showing the disposition of the heater coil with the write coil 54 of FIG. 6 removed.

Figure 8:
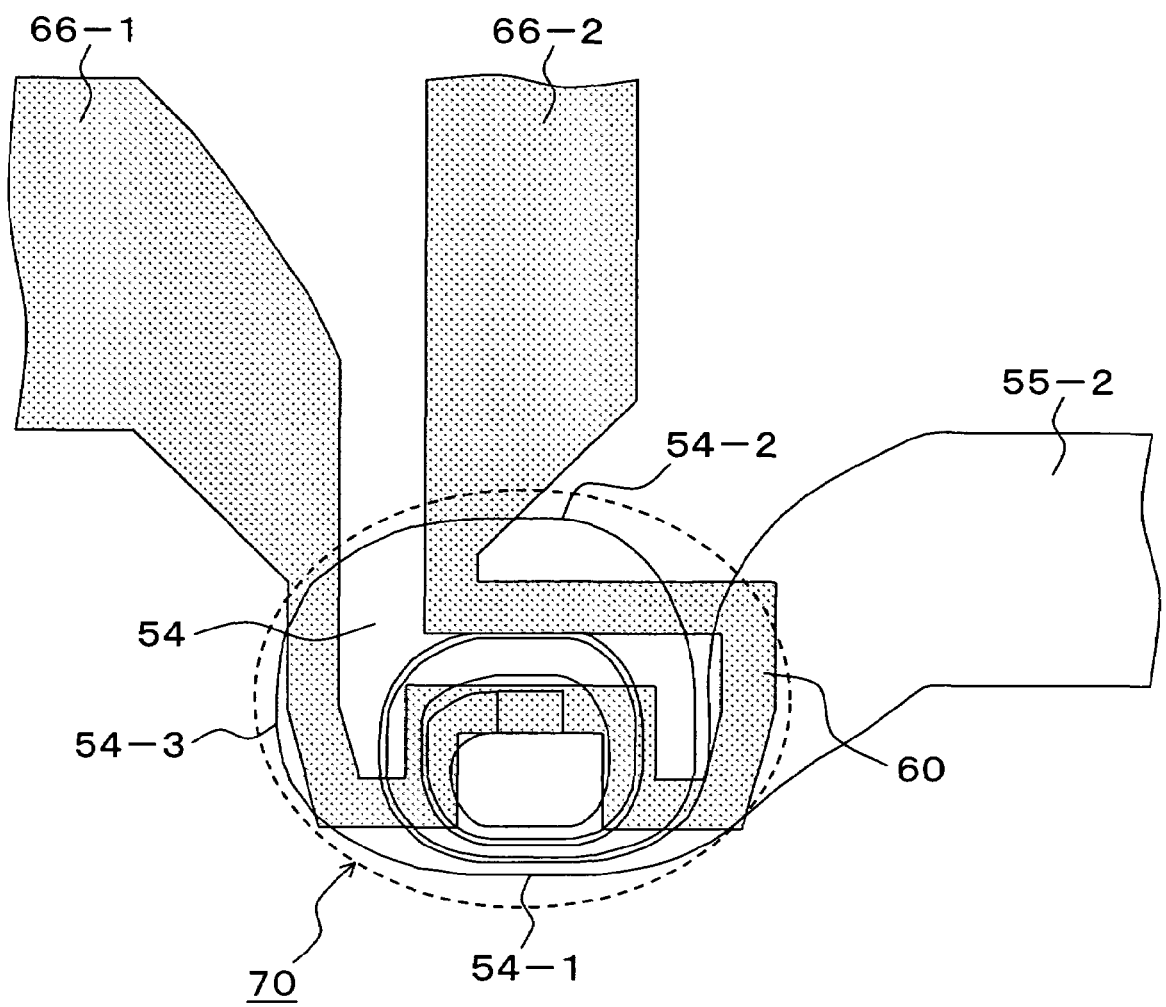
FIG. 8 is an explanatory drawing showing relative disposition of the write coil and the heater coil of the present embodiment in a see-through state.

FIG. 8 is an explanatory drawing showing the relative disposition of the write coil and the heater coil of the present embodiment in a see-through state. In FIG. 8, the inner spiral part of the write coil 54 where the terminal pattern 55-2 is led out is shown, and the heater coil 60 is disposed behind the write coil 54 as shown in the see-through state. The disposed position of the heater coil 60 is disposed such that it is generally included in a write coil facing area 70, which is determined by the spiral shape of the write coil 54. The write coil facing area 70 is an elliptical internal area which is generally in contact with upper and lower coil outer edges 54-1 and 54-2 of the write coil 54 and, in this embodiment, a left-side coil outer edge 54-3. Relative to the write coil facing area 70, the heater coil 60 is disposed such that the coil pattern having the predetermined width which functions as a heater is disposed in a generally W shape in the present embodiment. In more detail, in the coil pattern of the heater coil 60 in the write coil facing area 70, a terminal pattern 66-1 is connected to one end of the generally W-shape pattern, and the pattern of the generally W-shape pattern is further connected to another terminal pattern 66-2 provided above after the pattern is returned in the horizontal direction to the side where the terminal pattern 66-1 is connected. In FIG. 8, the connected patterns are shown in rectangular-shapes as the coil patterns of the heater coil 60; however, they may be patterns of which corners are chamfered. Herein, in disposition of the coil pattern of the heater coil 60 having the predetermined width in the write coil facing area 70, as is clear for example from the internal structure of FIG. 5 without the write coil 54, the both side and upper area except for the part facing the outer magnetic pole 52 of the write head 38, specifically, the part from the center of the spirally-disposed write coil 54 to the medium facing surface 40 side which emits recording magnetic flux serves as a pattern disposition area. In a specific example of the coil pattern having the predetermined width which is disposed in the write coil facing area 70 of the heater coil 60, for example, the thickness is 0.1 μm to 0.2 μm, the pattern width is 2 μm to 4 μm, the heater resistance of the entire heater coil 60 including the terminal patterns 66-1 and 66-2 is 50Ω to 150Ω, and the amount of heater power distribution is controlled in the range of 0 to 100 mA in order to change the protruding distance. In a desired embodiment of the present invention, with respect to the resistance of the entire heater coil 60 including the terminal patterns 66-1 and 66-2, the resistance of the part of the coil pattern having the predetermined width which is disposed in the write coil facing area 70 is desired to be 70% or more the entire resistance.

Figure 9:
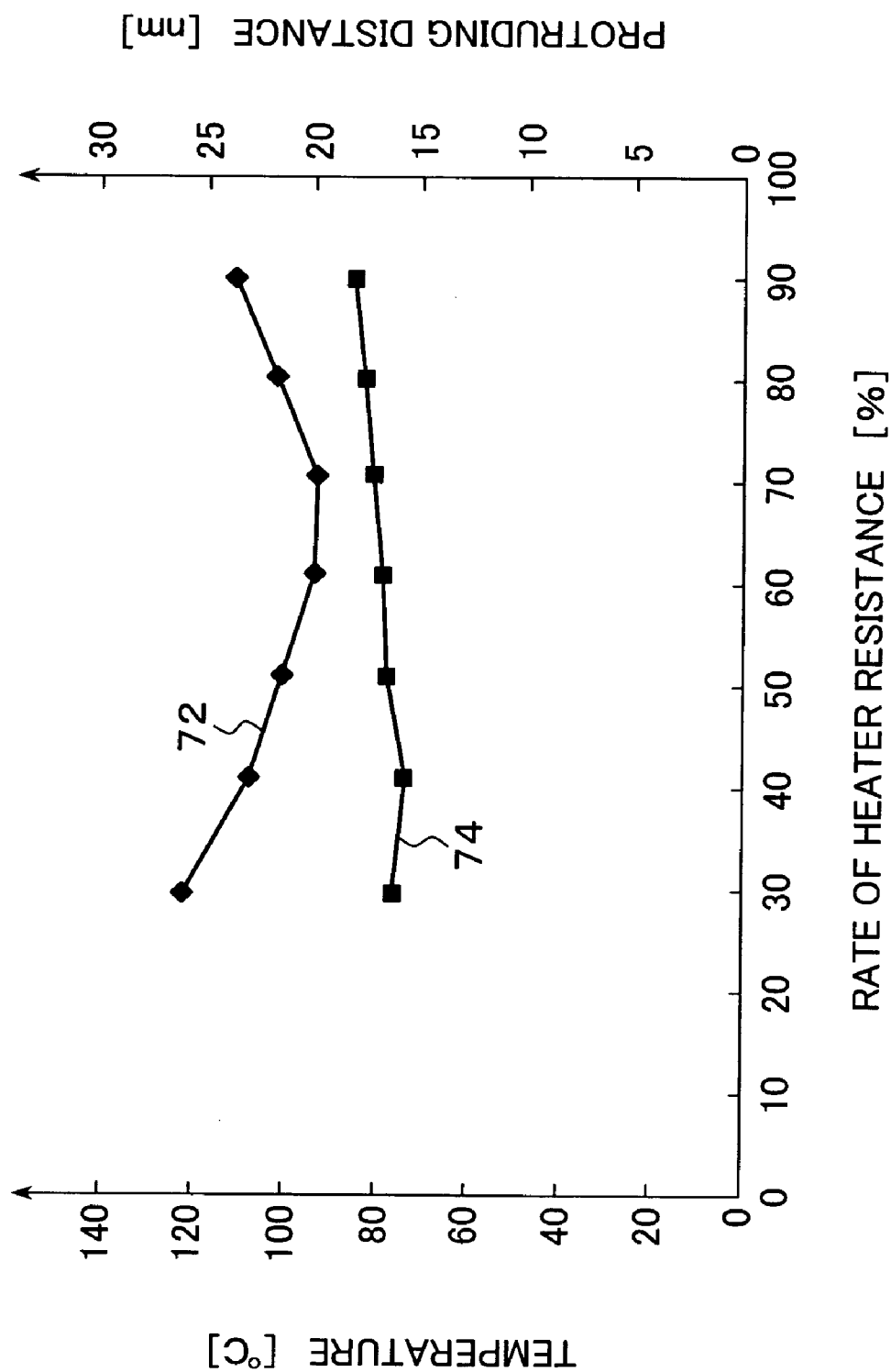
FIG. 9 is a graph diagram of heater temperatures and protruding distances in the case in which the rate of heater resistance present in the write coil facing area is varied.

FIG. 9 is a graph diagram of a heater temperature 72 and a protruding distance 74 in the case in which the rate (%) of the heater resistance present in the write coil facing area 70 is changed, wherein the heater heating value is constant at 100 mW. In FIG. 9, the protruding distance 74 increases along with increase in the rate of the heater resistance; however, the heater temperature 72 has an extreme value when the rate of the heater resistance is about 70%, and the heater temperature increases when the rate of the heater resistance is low since heat generation outside the coil facing area is increased. When the rate of the heater resistance is 70%, heat is efficiently dissipated to the write coil, and the heater temperature becomes the minimum. Therefore, in the present embodiment, heater designing in the area in which the protruding distance is large is considered, and the rate of the heater resistance present in the write coil facing area 70 is desirably 70% or more. The area of the heater coil 60 in the write coil facing area 70 is desirably 20% or more. As described above, in the present embodiment, the heater efficiency can be improved by disposing the coil pattern having the predetermined width which functions as a heater of the heater coil 60 so that it is in the write coil facing area 70, and providing the terminal patterns 66-1 and 66-2 having wide width in the outside out of the write coil facing area 70. More specifically, when power is distributed to the heater coil 60, heat generation is concentrated in the part of the coil pattern having the predetermined width which is positioned in the write coil facing area 70, and little heat is generated in the terminal patterns 66-1 and 66-2 having the wide width. Consequently, heat is efficiently transmitted to the write coil 54 which faces the coil pattern of the heater coil 60 disposed in the write coil facing area 70, and the write coil 54 is heated and thermally expanded. Thus, as shown in FIG. 3, the part including the write gap 56 and the read element 46 of the medium facing surface 40 of the magnetic head 18 can be efficiently caused to protrude toward the side of the magnetic disk 14 as shown in the protruding unit 62.

Moreover, as shown in FIG. 8, the heat of the heater coil 60 of which heat generating unit is concentrated and disposed in the write coil facing area 70 can be efficiently transmitted to the write coil 54. Therefore, the temperature of the heater coil 60 can be suppressed low, local temperature increase can be avoided, and migration of the heater coil 60 and performance deterioration of the write gap (write element) or the read element can be prevented. Furthermore, in the heater coil 60, the wide terminal patterns 66-1 and 66-2 are disposed outside the write coil facing area 70, and the heater pattern of the heater coil 60 having a width narrower than the terminal patterns 66-1 and 66-2 is disposed in the write coil facing area 70. Consequently, the part where a heat generating effect as a heater is desired to be obtained is narrowed to increase resistance, and the terminal patterns which are irrelevant to heat generation are widened to reduce resistance and suppress heat generation, thereby making heat generation efficient.

Figure 10:
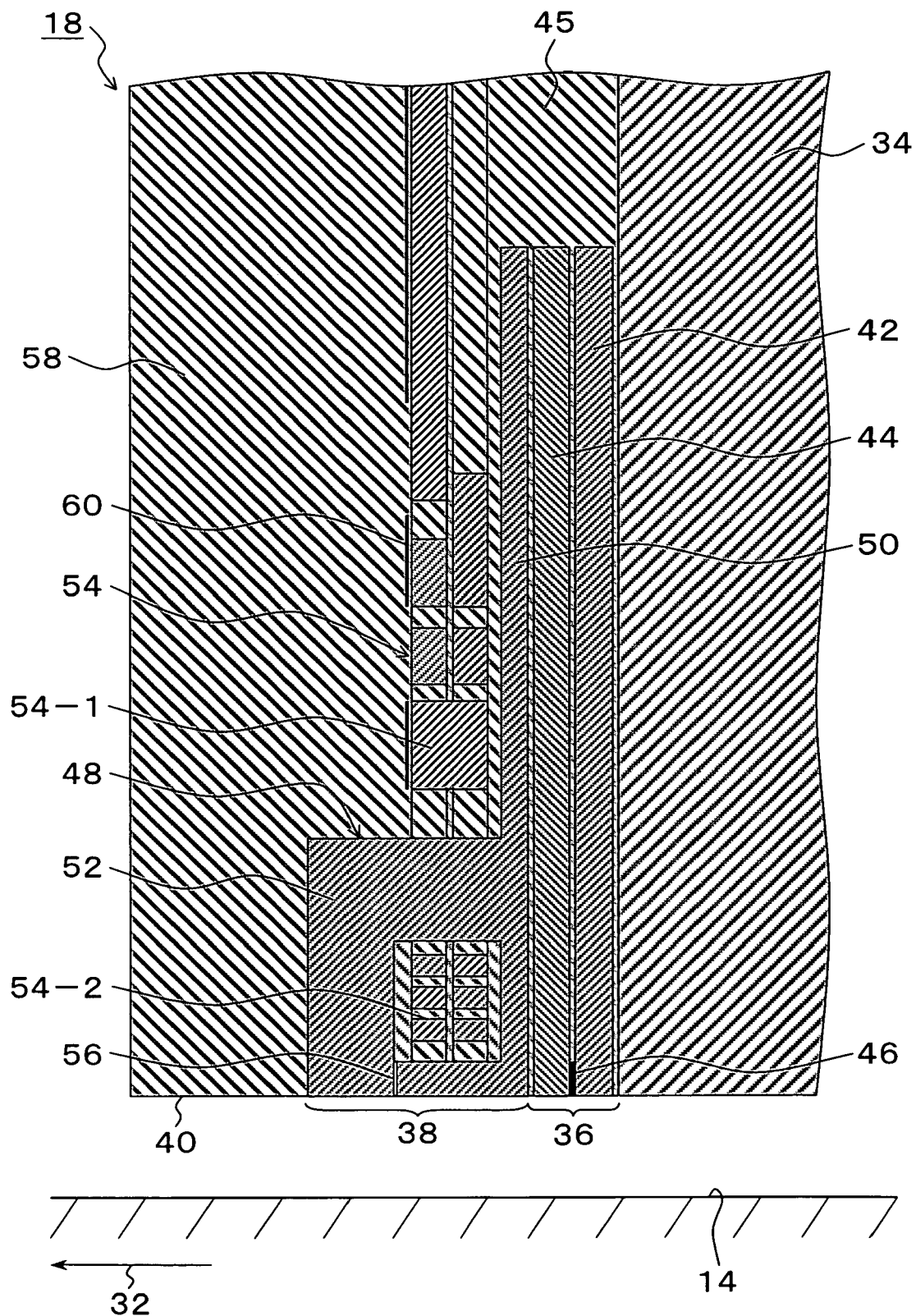
FIG. 10 is a cross sectional view showing another embodiment of the magnetic head according to the present invention.

FIG. 10 is another embodiment of the magnetic head according to the present invention, and this embodiment is characterized in that, in the manner opposite to the embodiment of FIG. 2, the heater coil 60 is disposed in the side of the outer magnetic pole 52 with respect to the write coil 54 via the insulating layer. Also in the present embodiment, when power is distributed to the heater coil 60, heat is efficiently transmitted to the write coil 54, and the write coil 54 is heated and thermally expanded; and, consequently, the part of the medium facing surface 40 including the write gap 56 and the read element 46 can be efficiently caused to protrude toward the side of the magnetic disk 14 as shown by the protruding unit 62.

Figure 11:
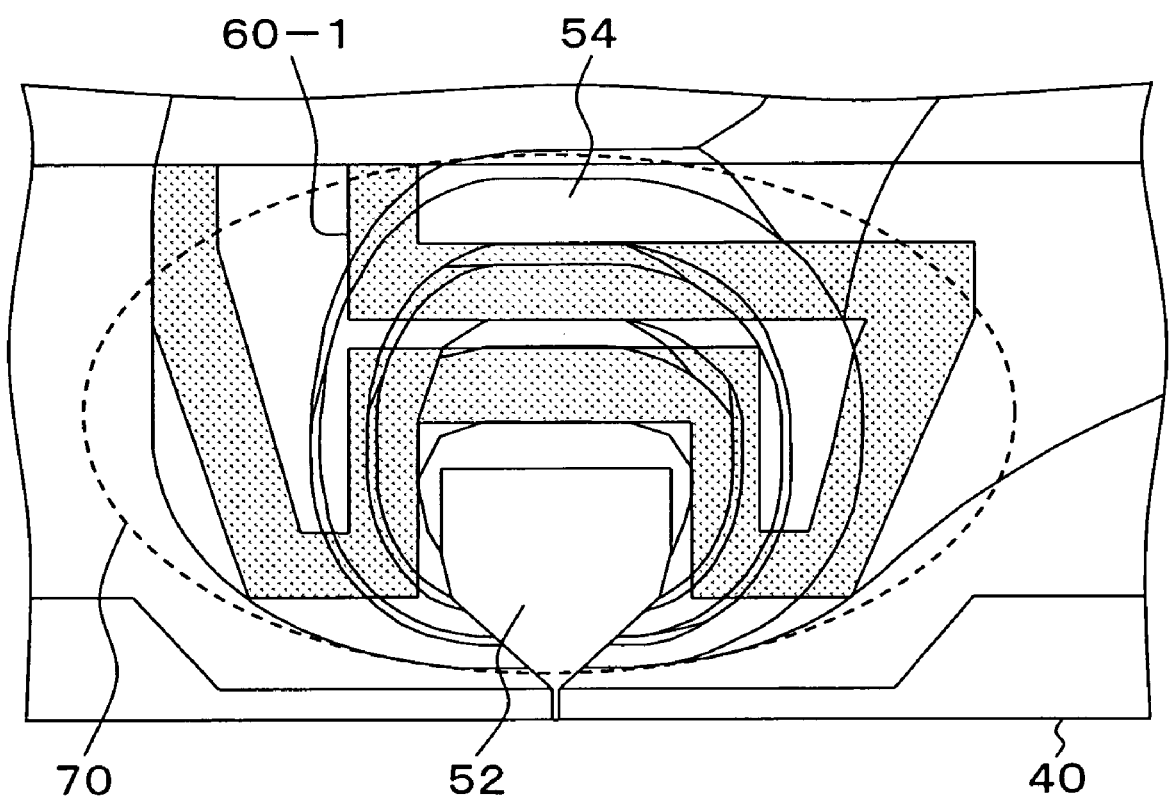
FIG. 11 is an explanatory drawing of another embodiment having a different heater coil pattern.

FIG. 11 is an explanatory drawing of another embodiment having a different heater coil pattern. In FIG. 11, a heater coil 60-1 of this embodiment has a shape which is basically same as the heater coil 60 shown in FIG. 8 which is generally W-shape, and the right side thereof is returned in the horizontal direction and then led to outside. However, since the coil outer edge of the write coil 54 has a width, an elliptical write coil facing area 70 which is laterally long corresponding to that is formed, and the coil pattern of the heater coil 60-1 is disposed in both sides and upper side except for the part of the outer magnetic pole 52 such that it is aligned with the write coil facing area 70.

Figure 12:
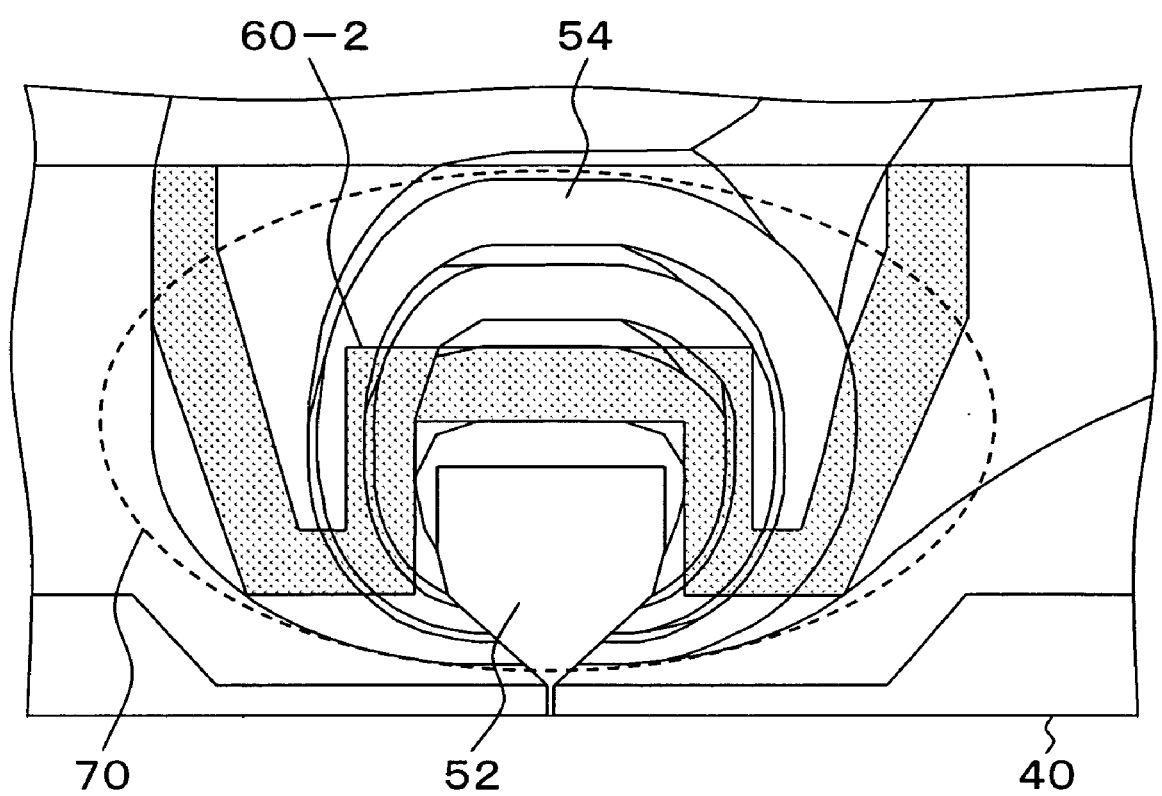
FIG. 12 is an explanatory drawing of another embodiment having a different heater coil pattern.

FIG. 12 is an explanatory drawing of another embodiment having a different heater coil pattern. In a heater coil 60-2 of this embodiment, a coil pattern is disposed in a generally W-shape except for the part facing the outer magnetic pole 52 of the write coil facing area 70. More specifically, the heater coil 60-2 is a coil pattern of a generally W-shape per se, wherein both upper ends of the generally W-shape coil pattern are led to outside of the write coil facing area 70 without modification and connected to the wide terminal patterns 66-1 and 66-2. When the heater coil 60-2 of FIG. 12 is compared with the heater coil 60-1 of FIG. 11, the heater resistance is reduced by the amount corresponding to the amount that the coil pattern of the horizontal part which returns from the right upper part to the left side is not provided.

Figure 13:
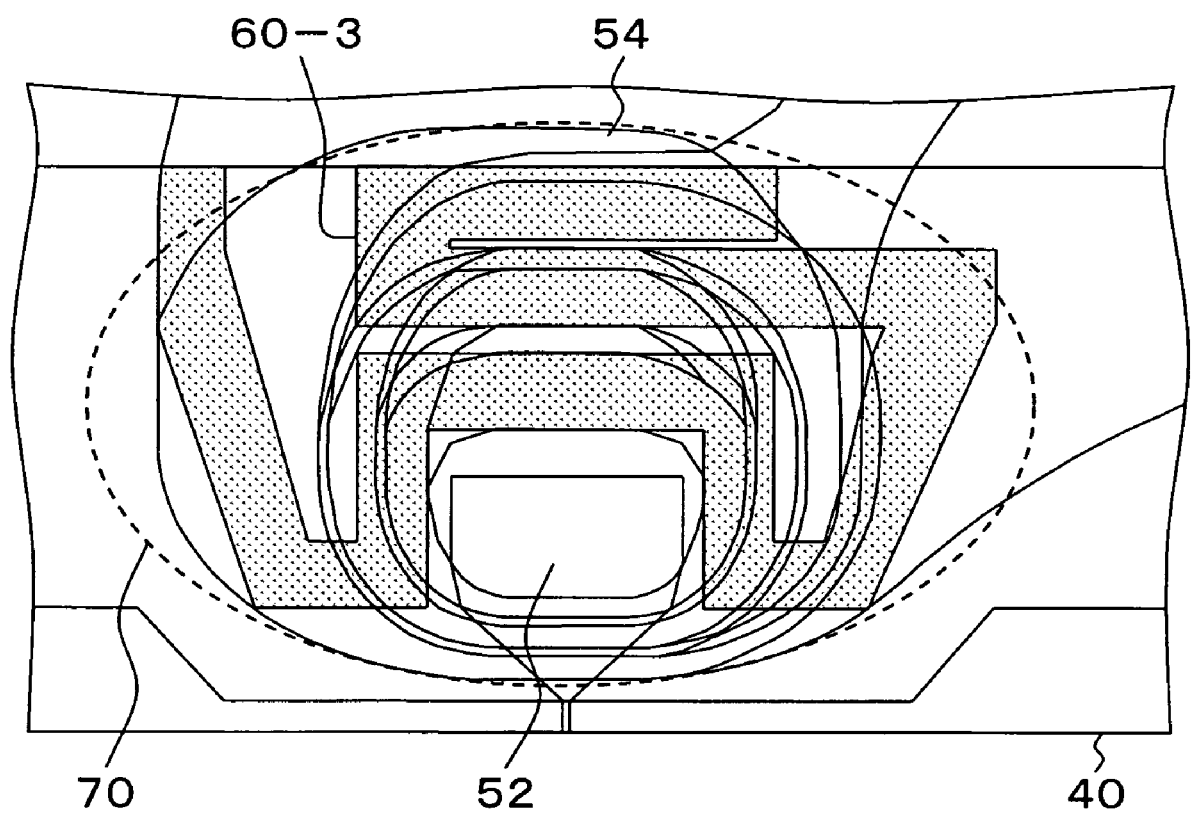
FIG. 13 is an explanatory drawing of another embodiment having a different heater coil pattern.

FIG. 13 is another embodiment having a different heater coil pattern. While the upper right end of the generally W-shape coil pattern of the heater coil 60-1 of FIG. 11 is laterally connected to the terminal pattern 66-2 once in the pattern; in the heater coil 60-3 of the present embodiment, it is moved in the right direction, then moved to an upper part, bent back, and then led to outside the write coil facing area 70 in the heater coil 60-3. Therefore, in the heater coil 60-3 of FIG. 13, the resistance of the heater in the write coil facing area 70 can be further increased compared with FIG. 12.

Figure 14:
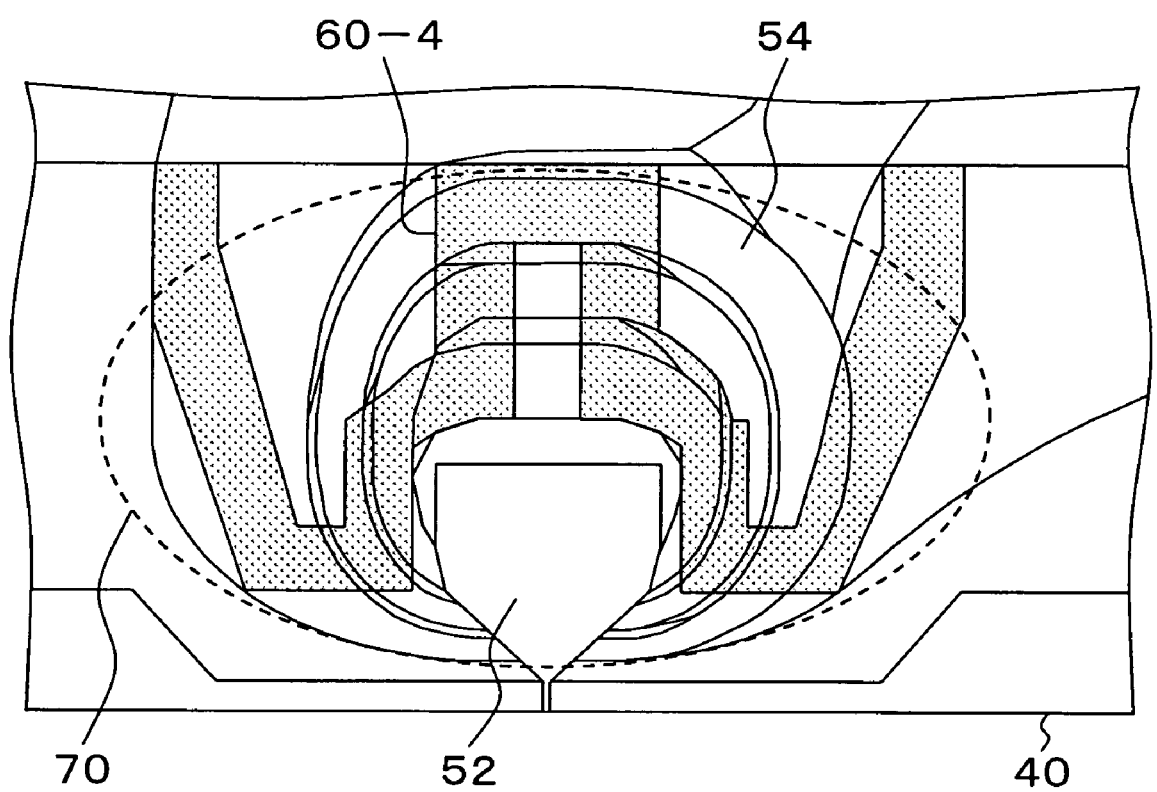
FIG. 14 is an explanatory drawing of another embodiment having a different heater coil pattern.

FIG. 14 is another embodiment having a different heater coil pattern. A heater coil 60-4 of this embodiment is basically the generally W-shape same as FIG. 11 to FIG. 13. However, the center part of the W-shape positioned above the outer magnetic pole 52 is extended like a comb tooth and bent back, thereby ensuring a sufficient coil length.

Figure 15:
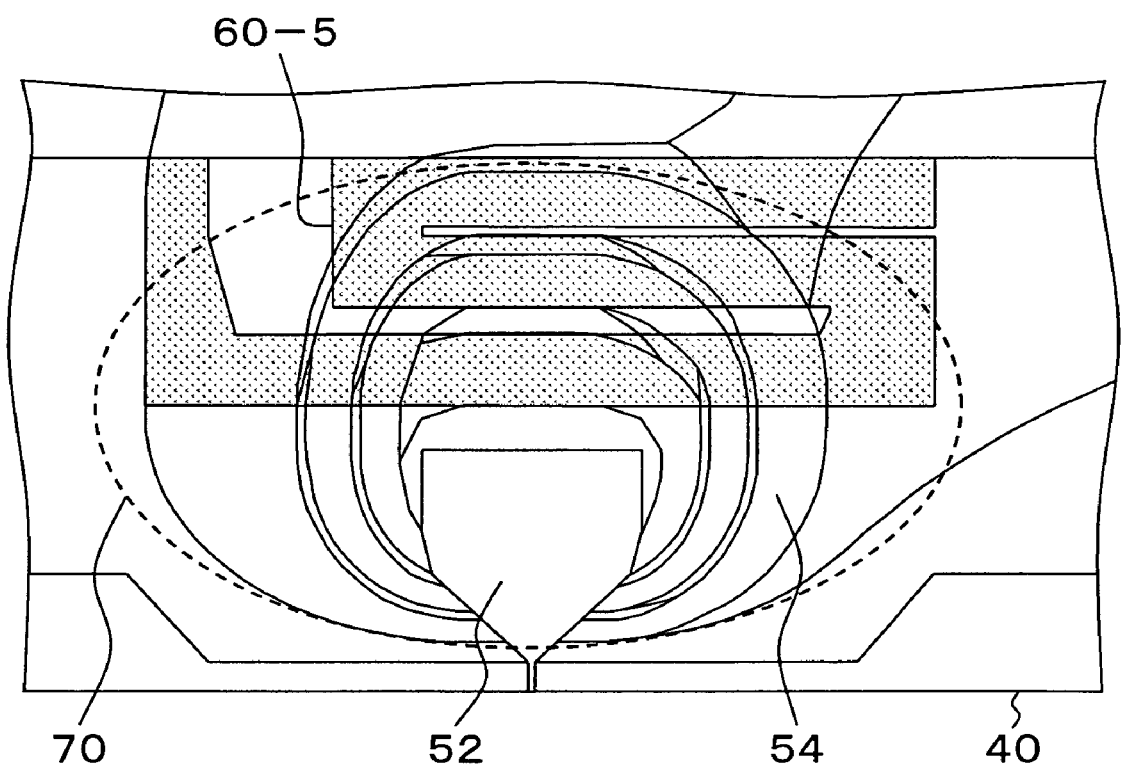
FIG. 15 is an explanatory drawing of another embodiment having a different heater coil pattern.

FIG. 15 is another embodiment having a different coil pattern. In a heater coil 60-5 of this embodiment, a coil pattern is disposed such that it is bent like comb teeth merely in the write coil facing area 70 in the upper side of the outer magnetic pole 52.

Figure 16:
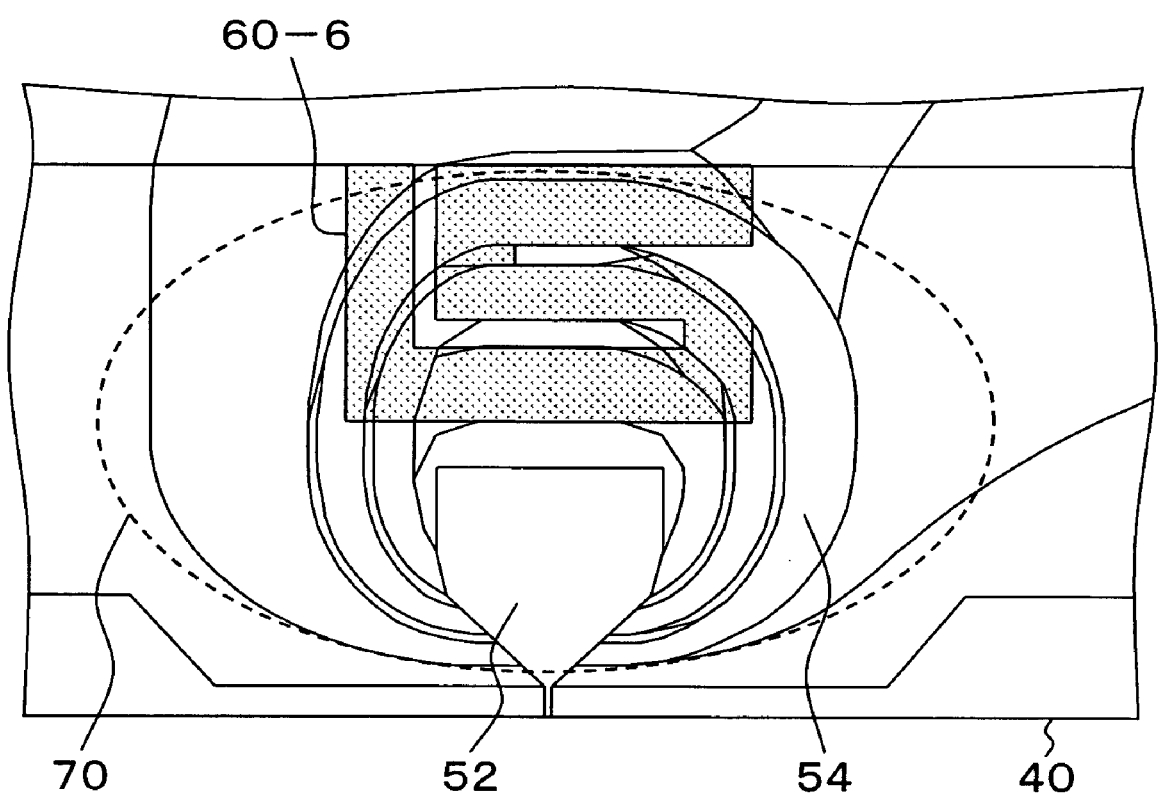
FIG. 16 is an explanatory drawing of another embodiment having a different heater coil pattern.

FIG. 16 is another embodiment having a different heater coil pattern. In a heater coil 60-6 of this embodiment, as well as FIG. 15, the coil pattern is disposed in the write coil facing area 70 above the outer magnetic pole 52; however, the disposed area is smaller in the lateral direction compared with FIG. 15.

Figure 17:
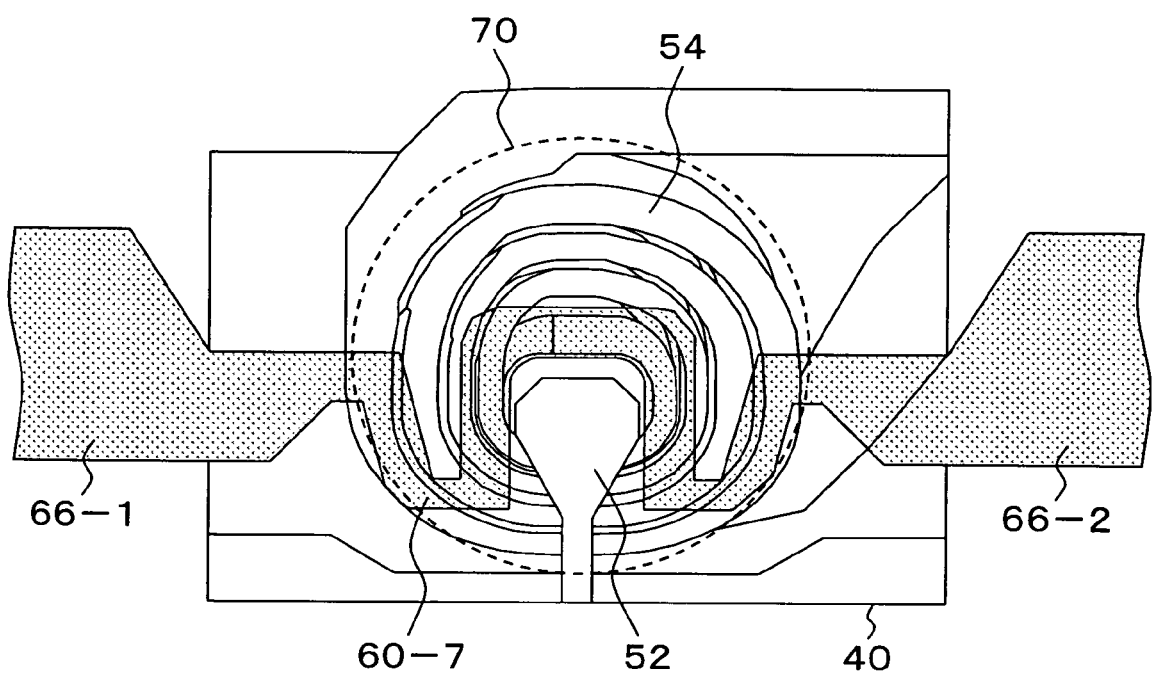
FIG. 17 is an explanatory drawing of another embodiment having a different heater coil pattern.

FIG. 17 is an explanatory drawing of another embodiment having a different heater coil pattern. In a heater coil 60-7 of this embodiment, the generally W-shape coil pattern which is basically same as FIG. 12 is disposed in both sides and above the outer magnetic pole 52. However, the write coil facing area 70 is generally circular in accordance with the spiral shape of the write coil 54, wide terminal patterns 66-1 and 66-2 are disposed in both sides with respect to the coil pattern of the heater coil 60-7 which is disposed in the circular write coil facing area 70 and has a predetermined width, and coil patterns are led out in the lateral direction and connected.

Figure 18:
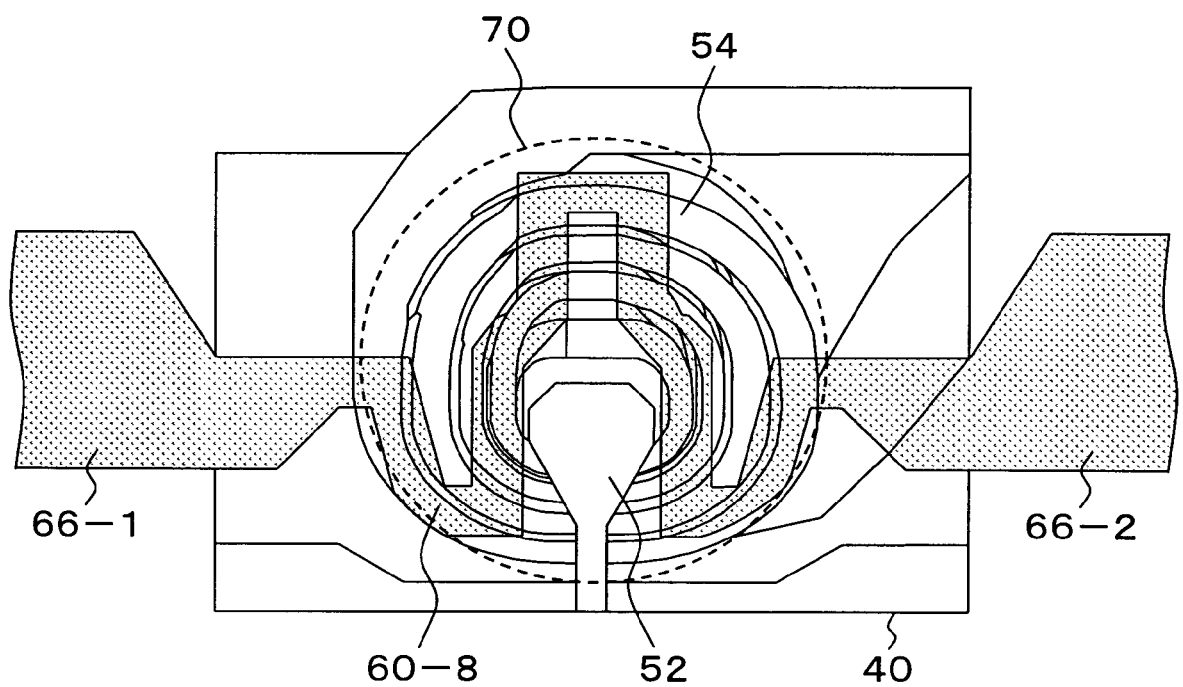
FIG. 18 is an explanatory drawing of another embodiment having a different heater coil pattern.

FIG. 18 is another embodiment having a different heater coil pattern. In a heater coil 60-8 of this embodiment, both sides of the outer magnetic pole 52 are same as the coil pattern of the heater coil 60-7 of FIG. 17. However, in the upper part of the outer magnetic pole 52, the coil pattern is upwardly bent and folded back, thus, the area of the coil pattern which occupies the write coil facing area 70 and has a predetermined width is increased, thereby increasing the heater resistance.

Figure 19:
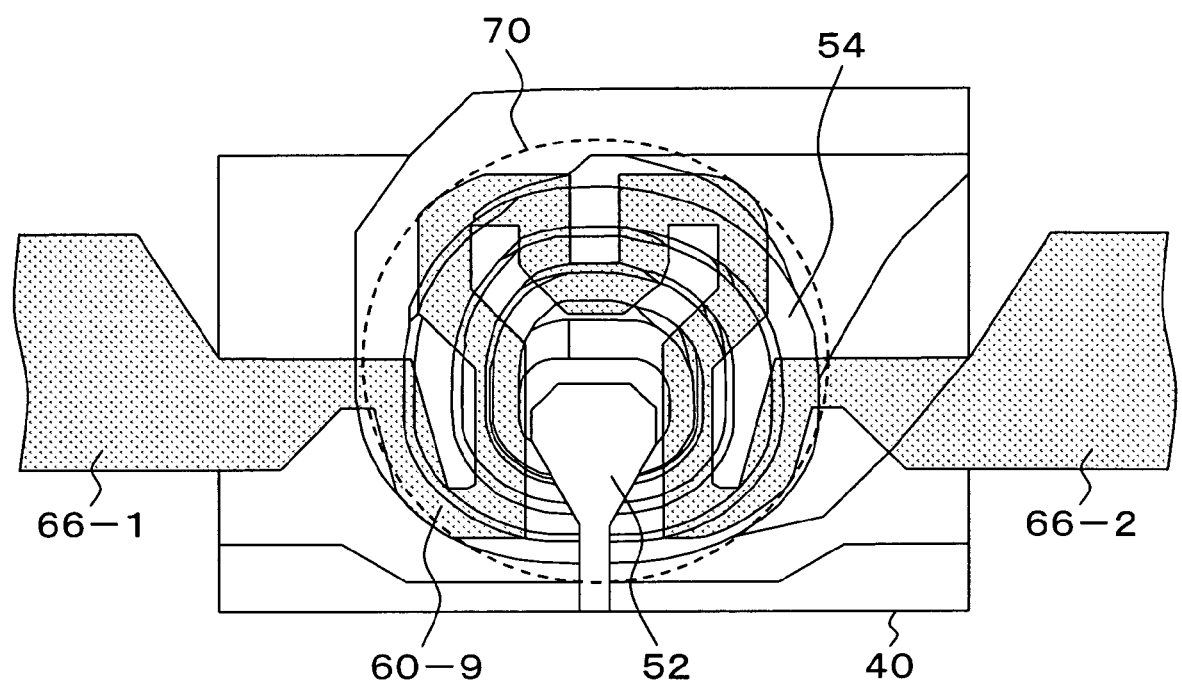
FIG. 19 is an explanatory drawing of another embodiment having a different heater coil pattern.

FIG. 19 is another embodiment having a different heater coil pattern, wherein both sides of the outer magnetic pole 52 are same as the heater coil 60-7 of FIG. 16. However, in the upper part of the outer magnetic pole 52, a coil pattern having a predetermined width is disposed in a generally M-shape, and the area of the heater coil occupied in the write coil facing area 70 is further increased compared with FIG. 18, thereby increasing the heater resistance. Any of the heater coils 60, 60-1 to 60-9 shown in the embodiments of FIG. 8, and FIG. 11 to FIG. 19 is disposed to satisfy the conditions that the resistance of the heater coil in the write coil facing area 70 is 75% or more or the area occupied by the heater coil is 20% or more. The present invention is not limited to the above described embodiments and includes arbitrary modifications that do not impair the object and advantages thereof. The coil patterns of the heater coil in the magnetic head of the present invention is not limited to the shapes shown in the above described embodiments, and a disposition shape of an arbitrary coil pattern can be employed as long as it is in the write coil facing area except for the part in the medium facing surface side from the outer magnetic pole 52. Furthermore, the present invention is not limited by the numerical values shown in the above described embodiments.

What is claimed is:

1. A magnetic head comprising a write head which magnetically records information by emitting magnetic flux, which is generated by a write coil composed of a spiral thin-film coil pattern, from a magnetic pole unit to a recording medium; and a read head having a reading element which is disposed in the vicinity of the write head and converts record magnetic flux, which is emitted from the recording medium, to an electric signal; the magnetic head characterized in that, in a write coil facing area facing parallel aspect in which the thin-film coil pattern of the write coil is disposed, a heater coil which causes a medium facing surface to protrude toward a recording medium side by thermal expansion caused by power distribution and overheating is disposed via an insulating layer; and in the heater coil, a wide terminal pattern is disposed outside the write coil facing area, and a heater pattern having a width narrower than the terminal pattern is disposed in the write coil facing area; and the heater coil in the write coil facing area is disposed in the write coil facing area except for the area facing the outer magnetic pole.

2. The magnetic head according to claim 1, wherein the heater coil is disposed in an inner magnetic pole side or an outer magnetic pole side of the magnetic pole unit via an insulating layer.

3. The magnetic head according to claim 1, wherein the connected pattern of the heater coil in the write coil facing area is a generally W-shape connected pattern, furthermore, a first end of the W-shape pattern is positioned at an area boundary and connected to a terminal pattern outside the write coil facing area, and the other end of the W-shape pattern is returned to the first end side of the W-shape pattern, then extended to the write coil facing area boundary, and connected to another terminal pattern outside the write coil facing area.

4. The magnetic head according to claim 1, wherein the connected pattern of the heater coil in the write coil facing area is a generally W-shape connected pattern, and each of the first end and the other end of the W-shape pattern is extended to the area boundary and connected to a terminal pattern outside the write coil facing area.

5. The magnetic head according to claim 1, wherein the heater coil has the heater pattern which is disposed to occupy a 20% or more area of the write coil facing area.

6. The magnetic head according to claim 1, wherein a ratio of the heater pattern resistance in the write coil facing area for an entire heater coil resistance value is more than a value that the temperature becomes the local minimum.

7. The magnetic head according to claim 1, wherein the heater coil is formed of a high-resistance heating material containing tungsten and titanium tungsten.

* * * * *